United States Patent
Mosser et al.

[11] Patent Number: 6,075,190
[45] Date of Patent: Jun. 13, 2000

[54] DRUM HOLDER

[75] Inventors: Edward J. Mosser; John Trevor Adams, both of Burbank, Calif.

[73] Assignee: Remo, Inc., Valencia, Calif.

[21] Appl. No.: 09/307,277

[22] Filed: May 7, 1999

[51] Int. Cl.[7] .................................................. G01D 13/02
[52] U.S. Cl. ........................................ 84/421; 248/291.1
[58] Field of Search ........................... 248/291.1, 288.11, 248/288.51; 84/421, 411 R

[56] References Cited

U.S. PATENT DOCUMENTS

| | | | |
|---|---|---|---|
| 3,161,390 | 12/1964 | Larson | 248/40 |
| 3,734,439 | 5/1973 | Wintz | 248/224 |
| 4,747,569 | 5/1988 | Hoshino | 248/286 |
| 5,026,028 | 6/1991 | Ooi et al. | 256/67 |
| 5,331,878 | 7/1994 | Kurosaki | 84/421 |
| 5,383,637 | 1/1995 | Biber | 248/291 |
| 5,890,763 | 4/1999 | Asbjornsen | 297/285 |
| 5,936,176 | 8/1999 | Lombardi | 84/421 |
| 5,973,249 | 10/1999 | Liao | 84/421 |

*Primary Examiner*—Robert E. Nappi
*Assistant Examiner*—Kim Lockett
*Attorney, Agent, or Firm*—Rapkin & Gitlin

[57] ABSTRACT

An apparatus for holding drums comprising a connected series of rotatably interrelated tubular posts, clamps and plates for enabling the versatile repositioning of drums in combination with or apart from a musical drum set. One end of the apparatus connects to and is supported by a bass drum, floor stand, or rack cage and the other end is attached to a tom or some other similar type of musical drum. Two connected clamp assemblies are provided, including, one assembly having a single post member with one end that connects to a support structure, and the other end that connects to a C-type clamp through a mating receptacle, and another assembly, including a second, usually shorter, single post member, with one end that connects to a mounting fixture attached to the shell of a tom drum and the other end that connects to a second C-type clamp through a corresponding mating receptacle. The clamps are joined by two aligned and spaced apart connecting plates, which are attached to shafts inside each of the clamps. The various components are engaged to permit each post member to freely rotate at the swivel joint formed by the connection between each clamp and the corresponding ends of the connecting plates, which enables the drum connected to the holder to be freely and easily adjusted and repositioned relative to the position of the drummer and the various other components of the drum set.

7 Claims, 6 Drawing Sheets

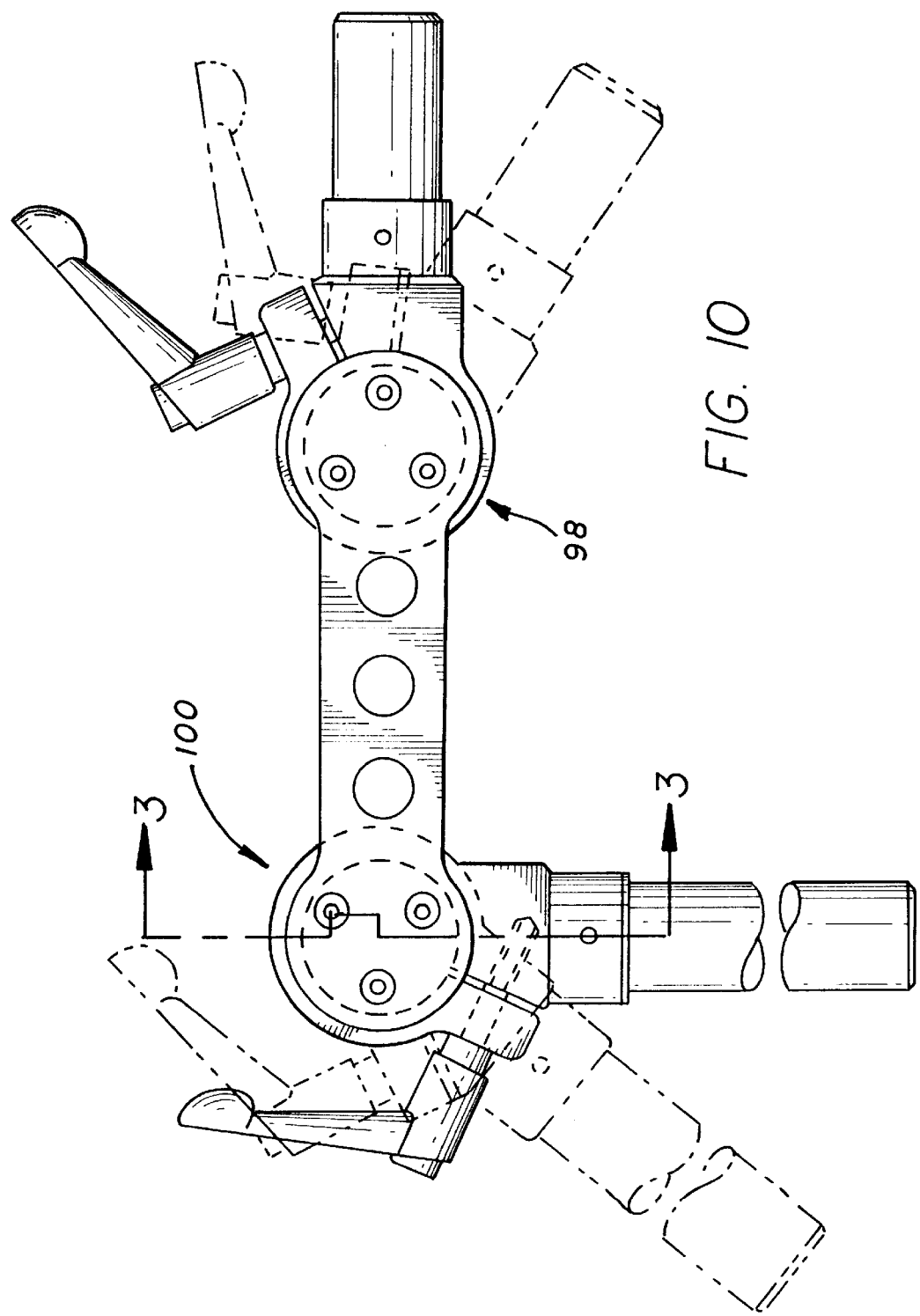

DRUM HOLDER

BACKGROUND OF THE INVENTION

1. Field of the Invention

The present invention is directed to a holding apparatus for a musical drum. More specifically, the apparatus of the present invention employs various components that enable the versatile lateral and angular repositioning of a tom or similar type of drum relative to the other drum and percussion components in a musical drum set.

2. Description of the Prior Art

Various types of drum holders, particularly tom drum holders, are known in the prior art. Existing holders usually take the form of a rigid vertically oriented tube-like shaft or post that employs an appropriate mounting device, which attaches to the shell of a tom drum with the cooperation of a mating fixture. The post, which rises vertically from the bass drum and is supported and secured there along its bottom section by an appropriate mount, can also incorporate a mounting device at the top that supports two toms. The upper portion of the shaft that supports the tom includes a fixture that connects to the drum by utilizing a mating receptacle mounted directly to the drum shell. A RIMS™ device or some other type of drum isolation apparatus that can be retrofitted to the shell may also be used for this purpose. In all these cases, the rigid upstanding post that is employed to support and secure the tom has limited adjustment or repositioning capability. Lateral and vertical adjustment capability is restricted by the design and structural inflexibility of the apparatus. For example, existing tom holders have limited swivel and extension capability. Certain tom holders that possess better lateral movement than some others are often deficient in other respects. Thus, the component of the drum holder that is inserted directly into the tom drum shell to secure the drum, in some instances will actually invade the shell, damaging its structural integrity and altering and even debilitating the drum sound.

Other kinds of tom holders, which do not incorporate a post or shaft-like structure, such as the L-type, have extremely limited lateral and vertical adjustment and extension capabilities, and do not offer the same degree of rigidity and stability.

A single post tom holder, which supports two drums, is generally not as strong as a double post holder, which includes two separate posts to support two drums, and does not offer comparable stability. Moreover, single post holders cannot be employed effectively with floor stands and rack cages, which thus restricts its use to the bass drum for support. In contrast, double post holders are more cumbersome, more costly, and can be unsightly.

With a conventional drum set arrangement, a right-handed drummer will normally face to the left of center of the set. The tom drums are normally positioned above the bass drum and situated somewhat to the right and left of center, respectively. Existing drum holders limit the drums to this arrangement and do not permit any significant flexibility in the positioning of the drums much beyond that location. A more versatile drum holder with increased strength and rigidity would have the capability of adjusting the position of the drums to permit the first tom to be situated in a more comfortable orientation directly in front of the drummer, and the mid-tom to be located directly over the bass drum. This arrangement would also allow other possibilities, such as accommodating the ride cymbal at a position closer to the drummer.

An examination of the prior art discloses the need for a sturdy, stable and lightweight tom holder that offers the flexible capability for a wide range of positioning alternatives and can be employed easily in conjunction with a large variety of mounts, stands and mounting fixtures.

SUMMARY OF THE INVENTION

The present invention provides an apparatus for holding drums comprising a connected series of rotatably interrelated tubular posts, clamps and plates for enabling the versatile repositioning of drums in combination with or apart from a musical drum set. One end of the apparatus is employed to connect to and be supported by a bass drum, floor stand, or rack cage and the other end is employed to attach to a tom or some other similar type of musical drum. Specifically, the apparatus of the present invention comprises two connected clamp assemblies. In one assembly, a single post member includes one end that is provided to connect to a support structure, such as an appropriate drum mount affixed atop a bass drum, and another end that is connected to a C-type clamp through a mating receptacle. In the other assembly, there is provided a second single post member, which may vary in length from the first, with one end that connects to a mounting fixture attached to the shell of a tom drum and another end that connects to a second C-type clamp through a corresponding mating receptacle. The clamps are joined by two aligned and spaced apart connecting plates, which are attached to shafts situated within each of the clamps. The various components are engaged to enable each post member to freely rotate at the swivel joint formed by the connection between each clamp and the corresponding ends of the connecting plates. This, in turn, enables the drum connected to the holder to be freely and easily adjusted and repositioned relative to the position of the drummer and the other components of the drum set.

Accordingly, it is an object of the present invention to provide an improved holder for a tom or similar type of musical drum.

Another object of the present invention is to provide an improved holder for a tom or similar type of musical drum that enables the drum to be adjusted and positioned laterally and angularly over a wider range of applicability than was possible with the use of drum holders in the prior art.

A further object of the present invention is to provide an improved holder for a tom or similar type of musical drum that is lightweight and rigid and offers greater stability than existing drum holders.

A still further object of the present invention is to provide an improved holder for a tom or similar type of musical drum that is easy to adjust.

A still further object of the present invention is to provide an improved holder for a tom or similar type of musical drum that is easy to manufacture and use.

A still further object of the present invention is to provide an improved holder for a tom or similar type of musical drum that can be utilized with a bass drum, cage rack, floor stand and various other kinds of existing drum mounts.

Other objects and advantages of the present invention will become apparent in the following specifications when considered in light of the attached drawings wherein a preferred embodiment of the invention is illustrated.

BRIEF DESCRIPTION OF THE DRAWINGS

FIG. 10 is a perspective view of the apparatus of the present invention with the rotational links shown (partially in phantom) in a swivelling movement.

DETAILED DESCRIPTION OF THE PREFERRED EMBODIMENT

Figure 1:
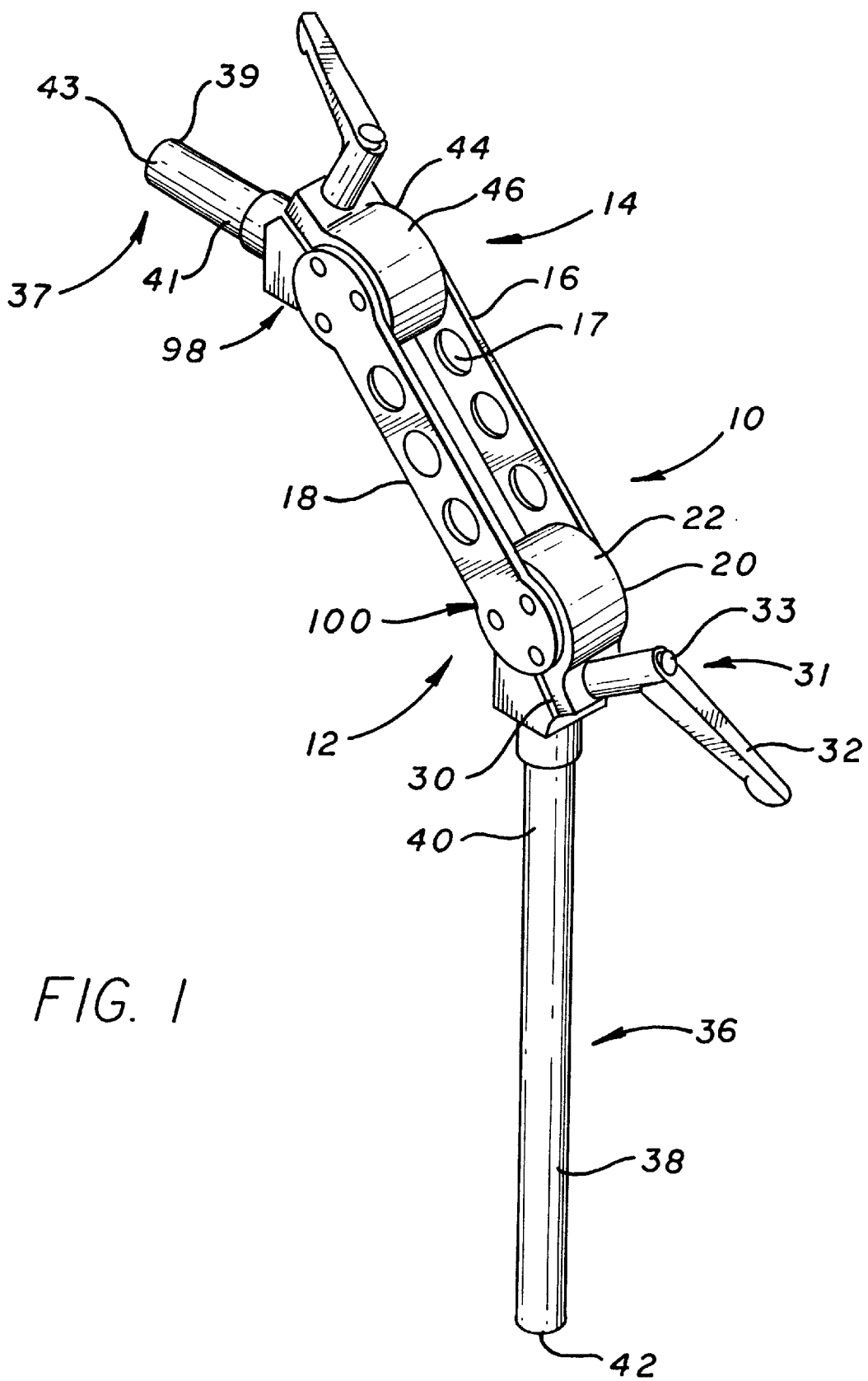
FIG. 1 is a perspective view of the apparatus of the present invention.
Figure 2:
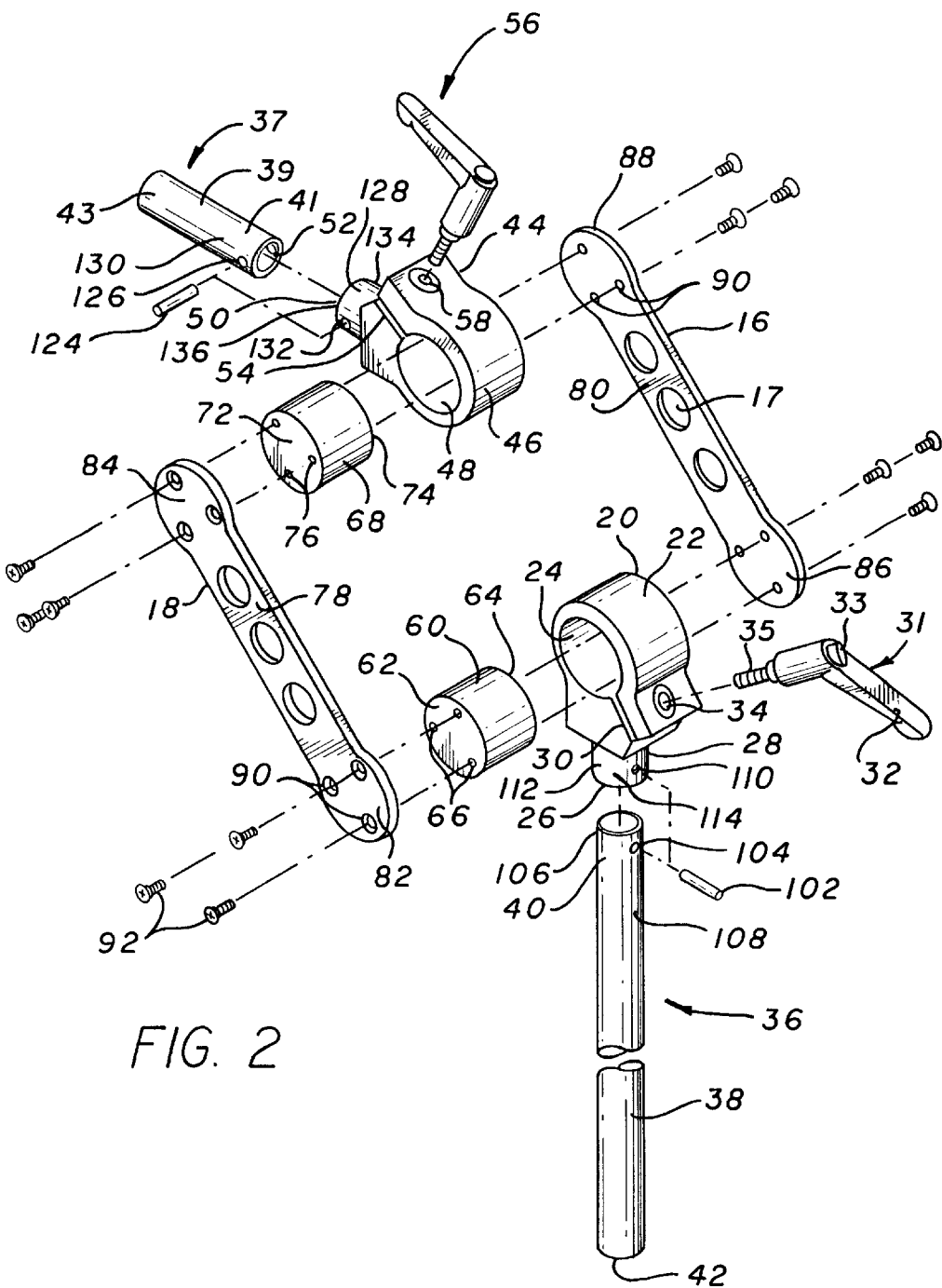
FIG. 2 is an exploded view of the apparatus of the present invention.
Figure 3:
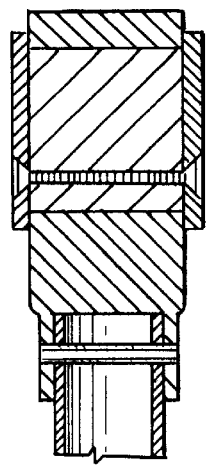
FIG. 3 is a sectional view of the apparatus of the present invention taken along line 3—3 of FIG. 10.
Figure 11:
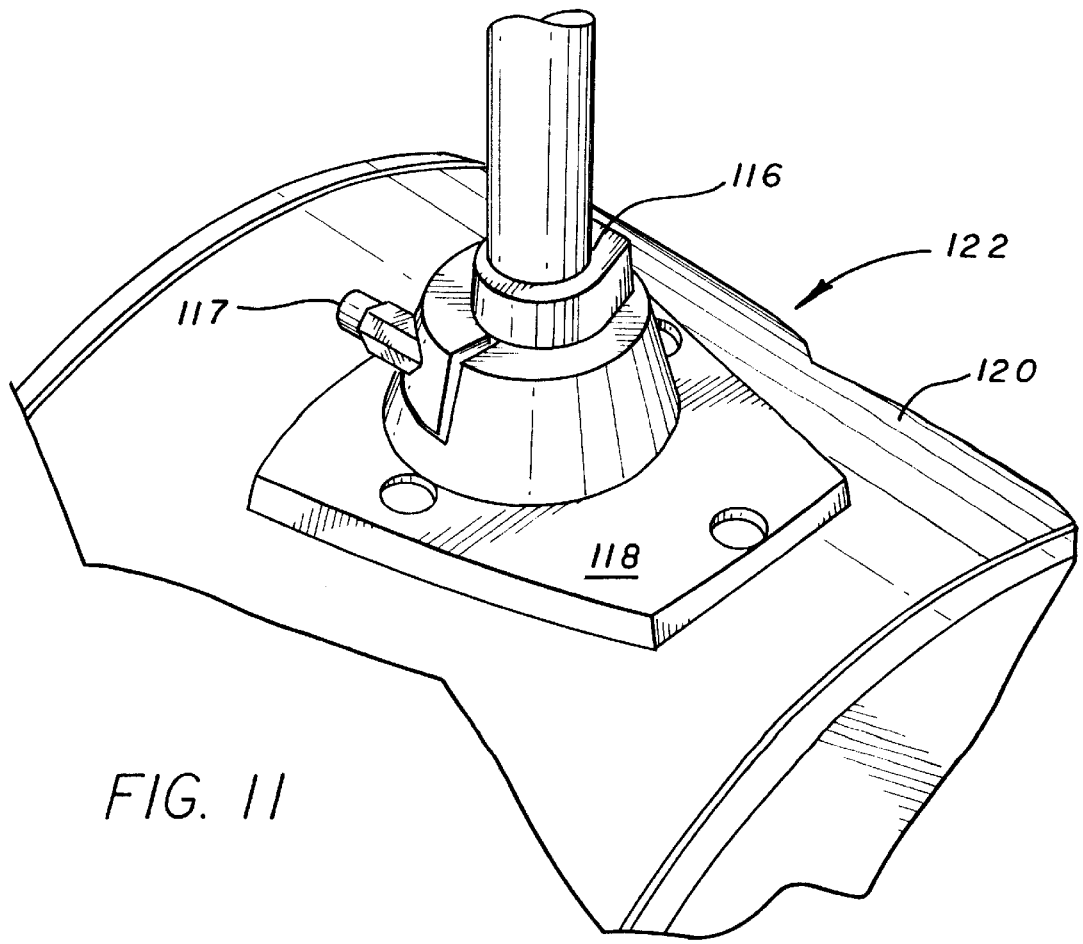
FIG. 11 illustrates a post member of the apparatus of the present invention shown inserted and secured within a mating receptacle in a bass drum mount.
Figure 7:
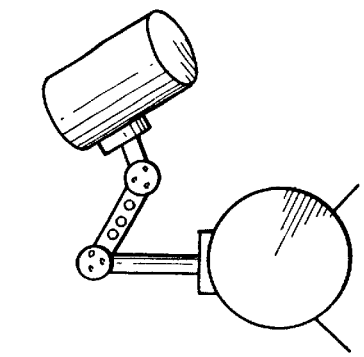
FIG. 7 illustrates the apparatus of the present invention shown holding the tom drum in one of the various available positions.
Figure 6:
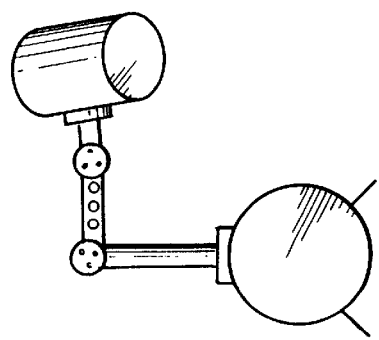
FIG. 6 illustrates the apparatus of the present invention shown holding the tom drum in one of the various available positions.
Figure 5:
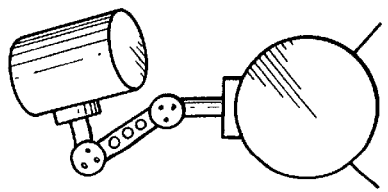
FIG. 5 illustrates the apparatus of the present invention shown holding the tom drum in one of the various available positions.
Figure 4:
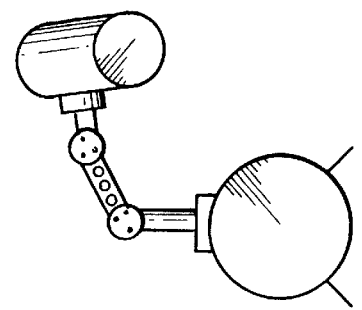
FIG. 4 illustrates the apparatus of the present invention shown holding the tom drum in one of the various available positions.
Figure 9:
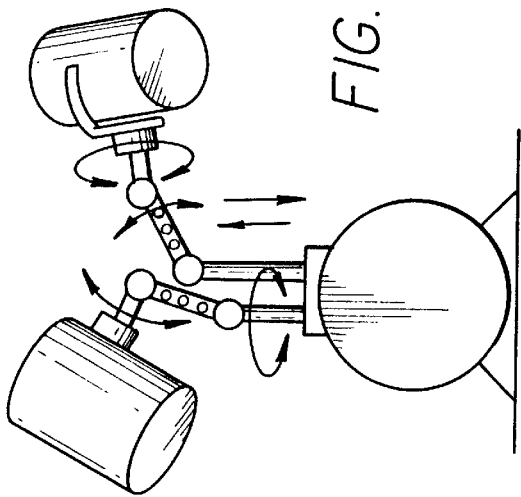
FIG. 9 illustrates two individual drum holders in accordance with the present invention shown supported by a bass drum.
Figure 8:
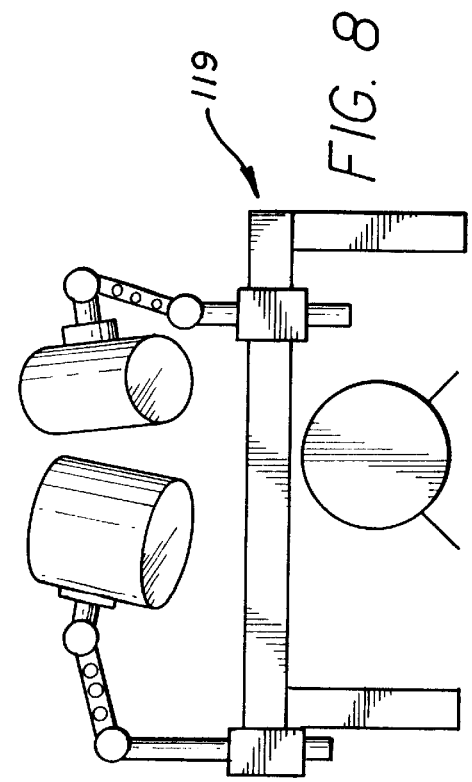
FIG. 8 illustrates two individual drum holders in accordance with the present invention shown attached to a rack cage situated over a bass drum.
Figure 12:
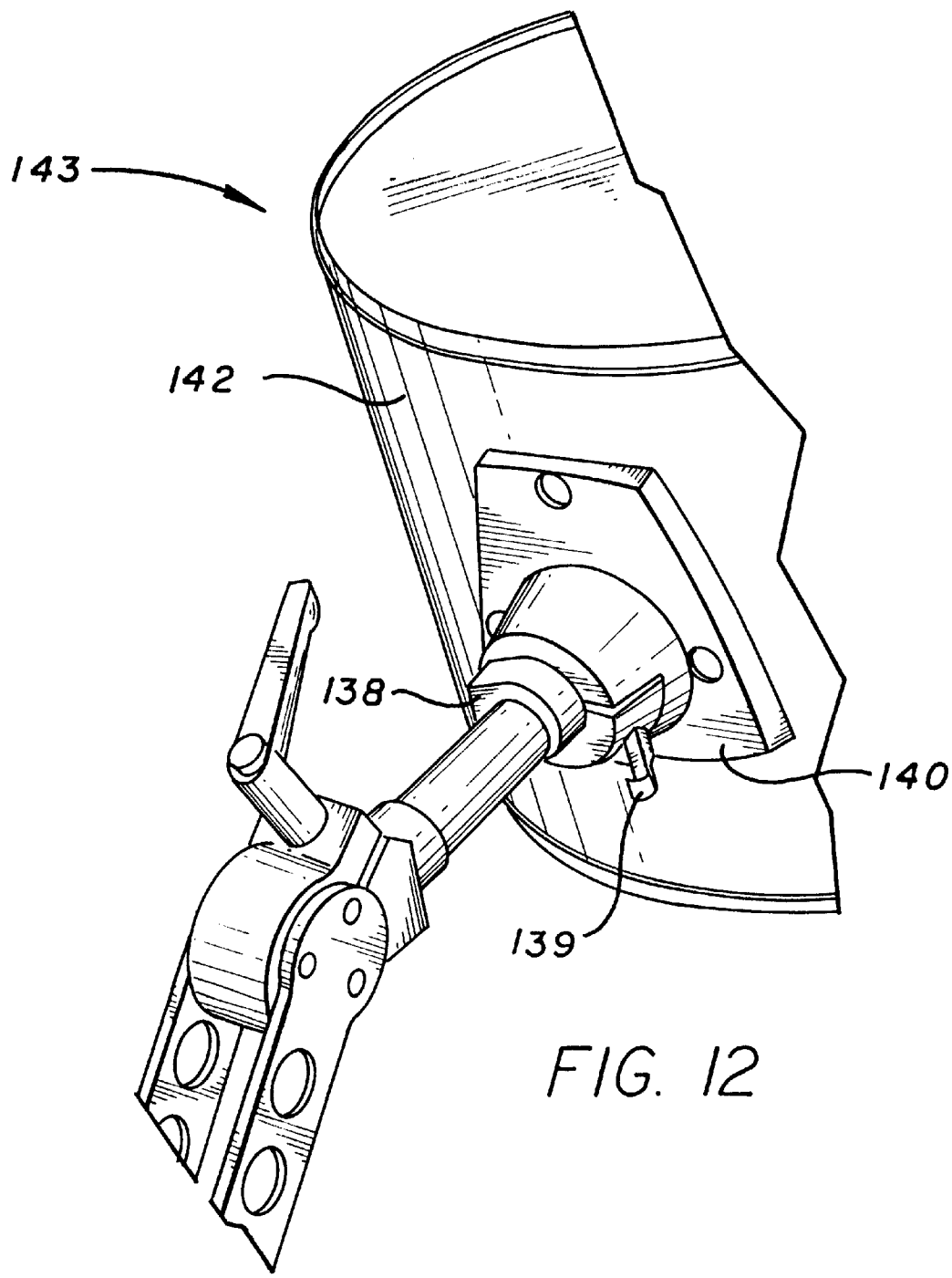
FIG. 12 illustrates a post member of the apparatus of the present invention shown inserted and secured within a mating receptacle in a tom drum mount.

Referring more particularly to the drawings, FIG. 1 is a perspective view of the drum holder 10 of the present invention. Drum holder 10 is comprised of clamp assemblies 12 and 14, which are attached by connecting plates 16 and 18.

Clamp assembly 12 includes a C-clamp 20 having main body 22, shaft receiving opening 24 and shaft receiving opening 26, which is defined by circumventing collar 28, slotted opening 30, tension adjusting device 31 and opening 34. Clamp assembly 12 also includes arm member 36 having a main shaft 38 and end sections 40 and 42. Tensioning device 31 includes a lever 32 and a push button 33. In order to prevent lever 33 from protruding out too far and possibly interfering with the other components of the drum set, or any of the related fixtures and devices, lever 32 can be disengaged from screw 35 by merely depressing button 33 and then rotating lever 32 out of the way.

Clamp assembly 14 includes C-clamp 44 having main body 46, shaft receiving opening 48, shaft receiving opening 50, which is defined by circumventing collar 52, slotted opening 54, tension adjusting device 56 and opening 58. Clamp assembly 14 also includes arm member 37 having main shaft 39 and end sections 41 and 43. Tension adjusting device 56 operates in the identical manner and includes the same components as device 32.

Shaft receiving opening 24 includes shaft 60, which generally conforms to and is free to rotate within the space defined by opening 24 and includes annular mounting plates 62 and 64 with one or more spaced openings 66 formed therein.

Shaft receiving opening 48 includes shaft 68, which generally conforms to and is free to rotate within the space defined by opening 48 and includes annular mounting plates 72 and 74 with one or more spaced openings 76 formed therein.

Connecting plates 16 and 18 are disposed in aligned and spaced apart relation and include main shafts 78 and 80 and end sections 82 and 84, and 86 and 88, respectively. End sections 82 and 84, and 86 and 88 include spaced openings 90 and abut and generally conform, respectively, to annular mounting plates 62 and 72, and 64 and 74. Screws 92 or similar means are inserted into spaced openings 90 and continue through openings 76, which are aligned therewith, to affix and tightly secure connecting plates 16 and 18 to shafts 60 and 68, respectively, where rotatable links 98 and 100 are formed. Connecting plates 16 and 18 includes a multitude of openings 17, which are provided for aesthetic purposes and to lighten the overall weight of the drum holder 10.

To assemble drum holder 10, end section 40 of arm member 36 is inserted into shaft receiving opening 26. Arm member 36 is secured in opening 26 by employing a rod 102 inserted transversely through arm member 36 into aligned apertures 104 and 106, which are formed within the sidewall 108, and through aligned apertures 110 and 112, which are formed within the sidewall 114 of collar 28. End section 42 is then inserted into mated socket 116 of bass drum mount 118, which is affixed to the upper drum shell surface 120 of the bass drum 122, and then secured there by rotating tension adjusting device 117, or any other suitable means.

End section 41 of arm member 37 is inserted into shaft receiving opening 50 and secured therein by employing a rod 124 inserted transversely through arm member 37 into apertures 126 and 128, which are formed within the sidewall 130, and through aligned apertures 132 and 134, which are formed within the sidewall 136 of collar 52. End section 43 is inserted into mated socket 138 of tom drum mount 140, which is affixed to the drum shell surface 142 of tom drum 143, and then secured there by rotating tension adjusting device 139 or any other suitable means. Arm member 37, in the preferred embodiment, is shown as being shorter in length than arm member 36, which needs to be longer to enable it to lift the tom drum(s) to a height that is most comfortable and offers the best orientation for the drummer.

Certain drums include mounts with a tube extended outwards to connect to the drum holder. In order to customize the connection to achieve the correct orientation and placement of the drum for a particular drummer, the tube is often cut to reduce its size. The present invention eliminates the need to cut any component of the drum mount or alter its physical structure in any manner due to its unique ability to move about with tremendous flexibility and position the tom drum accordingly.

Drum holder 10 can be fabricated of steel, aluminum or any other appropriate metal alloy or rigid synthetic material. For the preferred embodiment, dimensions of the principal components (in inches) are approximate, as follows: Clamps 20 and 44, each 1.75 in diameter, 1.125 in width, and 3.00 in length (including corresponding collars 28 and 52); shaft receiving openings 24 and 48, each 1.125 in diameter and 1.125 in length; slotted openings 30 and 54, each 0.062 in width and 0.875 in length; collars 28 and 52, each 0.625 in length and 1.062 in diameter; arm member 36 is 9.50 in length and 0.75 in diameter, and arm member 37 is 2.25 in length and 0.75 in diameter. Connecting plates 16 and 18 are each 5.50 in overall length and 0.1875 in thickness, including main shafts 78 and 80, each being 2.50 in length and 1.00 in width, and end sections 82 and 84, and 86 and 88, each being 1.50 in diameter. Dimensions may vary depending upon a variety of factors.

In a typical application of the present invention, end section 42 of arm member 36 is inserted into mated socket 116 of bass drum mount 118 and secured there by a tension bolt 117. Other alternatives to the bass drum mount 118 include, without limitation, a floor stand (not shown) and drum rack cage 119. End section 43 of arm member 37 is then inserted into mated socket 138 of tom drum mount 140 of tom drum 143 and secured by a tension bolt 139. Drum holder 10 can then be manipulated manually either laterally or vertically by simply rotating links 98 and 100 in the appropriate direction. FIGS. 4 through 9 show several examples of the range of flexibility offered by the apparatus of the present invention. The position of the tom can be offset from the bass drum's position at almost any angle to permit the most comfortable and productive arrangement and orientation for the drummer. The range of extension of the holder 10 is limited only by the dimensions of the arm members 36 and 37, which can be shortened or lengthened according to need and circumstance.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

What is claimed is:

1. In combination with one or more musical drums employed in concert with or apart from a drum set, an apparatus for holding and adjusting the positions of said musical drums, comprising:

a first arm member, said first arm member having a first end and a second end, a first clamping means for receiving and clamping said first end of said first arm member, said first clamping means having a first shaft receiving aperture, and a second shaft receiving aperture situated transverse thereof, a second arm member, said second arm member having a first end and a second end, a second clamping means for receiving and clamping said first end of said second arm member, said second clamping means having a first shaft receiving aperture, and a second shaft receiving aperture situated transverse thereof, a first shaft means rotatably mounted within said second shaft receiving aperture of said first clamping means, a second shaft means rotatably mounted within said second shaft receiving aperture of said second clamping means, and a first connecting plate and a second connecting plate disposed in aligned and spaced apart relation to engage said first and second shaft means for joining and securing said first clamping means to said second clamping means, said first connecting plate and said second plate disposed to engage said first shaft means to join with said first clamping means to comprise a first rotatable link and to engage said second shaft means to join with said second clamping means to comprise a second rotatable link, whereby each of said first and second clamping means is rotatably operable relative to said first rotatable link and said second rotatable link, respectively.

2. The invention of claim 1 wherein each of said first and second clamping means includes a rotatable tightening device.

3. The invention of claim 1 wherein said apparatus for holding and adjusting the positions of said musical drum is supported by a bass drum.

4. The invention of claim 1 wherein said apparatus for holding and adjusting the positions of said musical drums is supported by a drum rack cage.

5. The invention of claim 1 wherein said apparatus is comprised of a metal alloy.

6. The invention of claim 1 wherein said apparatus is comprised of a synthetic material.

7. The invention of claim 1 wherein the apparatus is operable to extend, tilt, and rotate to enable the repositioning of a musical drum.

* * * * *